United States Patent
Yokoyama et al.

(10) Patent No.: US 11,474,518 B2
(45) Date of Patent: Oct. 18, 2022

(54) EVENT VALIDATION USING MULTIPLE SOURCES

(71) Applicant: International Business Machines Corporation, Armonk, NY (US)

(72) Inventors: Satoshi Yokoyama, Ichikawa (JP); Akira Saito, Ichikawa (JP); Sanehiro Furuichi, Tokyo (JP); Hayato Uenohara, Funabashi (JP); Gaku Yamamoto, Machida (JP); Norie Iwasaki, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 16/410,779

(22) Filed: May 13, 2019

(65) Prior Publication Data

US 2020/0363799 A1 Nov. 19, 2020

(51) Int. Cl.
*G05D 1/00* (2006.01)
*G06F 16/23* (2019.01)
(Continued)

(52) U.S. Cl.
CPC ......... *G05D 1/0077* (2013.01); *G05D 1/0088* (2013.01); *G05D 1/0276* (2013.01); *G06F 16/2365* (2019.01); *G07C 5/02* (2013.01)

(58) Field of Classification Search
CPC .. G05D 1/0077; G05D 1/0088; G05D 1/0276; G06F 16/2365; G07C 5/02
See application file for complete search history.

(56) References Cited

U.S. PATENT DOCUMENTS 8,156,127 B1 * 4/2012 Lee .................. G06Q 10/063
707/758
8,948,144 B1 2/2015 Issa
(Continued)

FOREIGN PATENT DOCUMENTS

CN  110602643 A  12/2019
DE  WO 9948073 A1 * 9/1999 ........... G08G 1/0968
(Continued)

OTHER PUBLICATIONS

K. Wang et al., "Enabling Collaborative Edge Computing for Software Defined Vehicular Networks", IEEE Network • Sep./Oct. 2018, pp. 6.
(Continued)

*Primary Examiner* — Jelani A Smith
*Assistant Examiner* — Frank T Glenn, III
(74) *Attorney, Agent, or Firm* — Jorge R. Maranto

(57) ABSTRACT

A method and a system for event validation on a vehicle. The method includes detecting an event determined by the vehicle. The method can include requesting and receiving external event determination, from at least one external source within a first surrounding area, based on the event. The method also includes generating an internal event determination based on the event and validating a validated event based on the both the external and internal event determinations. The method includes requesting and receiving external drive plan, from the external source within a second surrounding area, based on the validated event. The method also includes generating an internal drive plan, validating a validated drive plan based on the internal and external drive plans, and implementing the validated drive plan.

17 Claims, 9 Drawing Sheets

(51) Int. Cl.
G07C 5/02 (2006.01)
G05D 1/02 (2020.01)

(56) References Cited

U.S. PATENT DOCUMENTS

| | | | |
|---|---|---|---|
| 9,922,565 | B2 | 3/2018 | Thomas et al. |
| 10,518,729 | B2* | 12/2019 | Kumar .................. G08G 1/0112 |
| 10,559,196 | B2* | 2/2020 | Matus .................. G08G 1/0133 |
| 2003/0204625 | A1 | 10/2003 | Cain |
| 2004/0189831 | A1* | 9/2004 | Shibatani ........... H04N 5/23299 348/240.99 |
| 2007/0087756 | A1 | 4/2007 | Hoffberg |
| 2009/0179775 | A1* | 7/2009 | Bos ........................ G08G 1/161 340/905 |
| 2012/0282934 | A1 | 11/2012 | Simonsson |
| 2014/0080481 | A1 | 3/2014 | Abraham |
| 2014/0081505 | A1* | 3/2014 | Klinger ................ G08G 5/0021 701/25 |
| 2014/0223019 | A1 | 8/2014 | McCann |
| 2015/0109961 | A1 | 4/2015 | Patil |
| 2015/0134743 | A1 | 5/2015 | Heo |
| 2015/0154871 | A1* | 6/2015 | Rothoff .................... G08G 1/22 701/2 |
| 2017/0041419 | A1 | 2/2017 | Zhong |
| 2017/0084175 | A1* | 3/2017 | Sedlik ...................... G08G 1/07 |
| 2017/0243504 | A1* | 8/2017 | Hada .................. B60W 30/165 |
| 2017/0287233 | A1* | 10/2017 | Nix ........................ G07C 5/08 |
| 2018/0059684 | A1 | 3/2018 | Hadfield |
| 2018/0075309 | A1* | 3/2018 | Sathyanarayana ... G05D 1/0055 |
| 2018/0077518 | A1 | 3/2018 | Nguyen |
| 2018/0121763 | A1* | 5/2018 | Surnilla .................. H04L 67/12 |
| 2018/0144640 | A1 | 5/2018 | Price et al. |
| 2018/0302424 | A1 | 10/2018 | Bender |
| 2018/0345963 | A1* | 12/2018 | Maura .................. G05D 1/0088 |
| 2019/0064913 | A1 | 2/2019 | O'Brien et al. |
| 2019/0122561 | A1* | 4/2019 | Shimizu ................ G06Q 10/02 |
| 2019/0289469 | A1 | 9/2019 | Bentley |
| 2020/0096360 | A1* | 3/2020 | Pfeifle .............. G08G 1/096791 |
| 2020/0282549 | A1* | 9/2020 | Torii ...................... B25J 9/1682 |

FOREIGN PATENT DOCUMENTS

| | | | | |
|---|---|---|---|---|
| JP | 2008299676 | A | | 12/2008 |
| JP | 2017188035 | A | | 10/2017 |
| JP | 2018508874 | | | 3/2018 |
| WO | WO-9948073 | A1 | * | 9/1999 ............ G08G 1/093 |
| WO | 2017037845 | A1 | | 3/2017 |

OTHER PUBLICATIONS

I. Farris et al., "MIFaaS: a Mobile-IoT-Federation-as-a-Service Model for Dynamic Cooperation of IoT Cloud Providers", Preprint submitted to Future Generation Computer Systems: SI on Mobile Edge Computing Jun. 24, 2016, pp. 30.
L. Chen et al., "Socially Trusted Collaborative Edge Computing in Ultra Dense Networks", SEC '17, Proceedings of the Second ACM/IEEE Symposium on Edge Computing, San Jose / Silicon Valley, CA, USA 2017 ACM, pp. 11.
K. Katayama et al., "Evacuation Guidance Support Using Cooperative Agent-based IoT Devices," Proc. of the IEEE 6th Global Conference on Consumer Electronics (GCCE 2017), pp. 98-99, Oct. 2017.
Mell et al., "Effectively and Securely Using the Cloud Computing Paradigm," [online], Oct. 7, 2009, 80 pages.
Furuichi et al., "Organizing a Temporary Device Group for Collaborative Computing," U.S. Appl. No. 16/737,425, filed Jan. 8, 2020.
List of IBM Patents or Patent Applications Treated as Related, Signed Mar. 3, 2020, 2 pages.
Ward, E., "Models Supporting Trajectory Planning in Autonomous Vehicles," Doctoral Thesis, 2018, 64 pages.
"N-version programming," Wikipedia, last edited Feb. 10, 2018, 2 pages. https://en.wikipedia.org/w/index.php?title=N-version_programming&oldid=824933441.
Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.
Behzadan, Vahid, and Banafsheh Rekabdar. "A game-theoretic model for analysis and design of self-organization mechanisms in iot." International Conference on Game Theory for Networks. Springer, Cham, 2017. (Year: 2017).
He, Linli, and Thomas R. Ioerger. "Forming resource-sharing coalitions: a distributed resource allocation mechanism for self-interested agents in computational grids." Proceedings of the 2005 ACM symposium on Applied computing. 2005. (Year: 2005).
Pal, Sujata, Barun Kumar Saha, and Sudip Misra. "Game theoretic analysis of cooperative message forwarding in opportunistic mobile networks." IEEE transactions on Cybernetics 47.12 (2017): 4463-4474. (Year: 2017).
Penner, Terry, et al. "Transient clouds: Assignment and collaborative execution of tasks on mobile devices." 2014 IEEE Global Communications Conference. IEEE, 2014. (Year: 2014).
Ray, Benay Kumar, Sunirmal Khatua, and Sarbani Roy. "A game theoretic model for cloud federation." Cloud Computing for Optimization: Foundations, Applications, and Challenges. Springer, Cham, 2018. 73-97. (Year: 2018).
Shehory, Onn, and Sarit Kraus. "Methods for task allocation via agent coalition formation." Artificial intelligence 101.1-2 (1998): 165-200. (Year: 1998).
Tsiropoulou, Eirini Eleni, Surya Teja Paruchuri, and John S. Baras. "Interest, energy and physical-aware coalition formation and resource allocation in smart IoT applications." 2017 51stAnnual Conference on Information Sciences and Systems (CISS). IEEE, 2017. (Year: 2017).
Yu, Rong, et al. "Cooperative resource management in cloud-enabled vehicular networks." IEEE Transactions on Industrial Electronics 62.12 (2015): 7938-7951. (Year: 2015).
W. Saad, Z. Han, T. Basar, M. Debbah and A. Hjorungnes, "A selfish approach to coalition formation among unmanned air vehicles in wireless networks," 2009 International Conference on Game Theory for Networks, 2009, pp. 259-267, doi: 10.1109/GAMENETS.2009. 5137409.
Konvoi, https://trimis.ec.europa.eu/project/konvoi, retrieved from the Internet on Jul. 20, 2022. 1 page.
International Search Report and Written Opinion, PCT/IB2020/062046, dated Mar. 23, 2021.

* cited by examiner

400

| ID | DEST ID | FUNCTION TYPE | LOGIC ID | VERSION | MAND. INPUT | COND. | INPUT | OUTPUT | RELIABILITY |
|---|---|---|---|---|---|---|---|---|---|
| 1 | VEH A | A | A0001 | 1.0 | XXX | XXX | XXX | XXX | 70 |
| 2 | STA B | A | A0002 | 1.0 | XXX | XXX | XXX | XXX | 90 |
| 3 | NET | A | A0001 | 1.1 | XXX | XXX | XXX | XXX | 80 |

411 412 413 414 415 416 417 418 419
410

| ID | FUNCTION TYPE | LOGIC ID | VERSION | INPUT CONDITION | RELIABILITY |
|---|---|---|---|---|---|
| 1 | A | A0001 | 1.0 | XXX | 50 |
| 2 | A | A0001 | 1.1 | XXX | 85 |
| 3 | A | A0001 | 2.0 | XXX | 80 |

422 424 426 427 429
420

| ID | FUNCTION TYPE | LOGIC ID | VERSION | MANDATORY INPUT | INPUT CONDITION | OUTPUT |
|---|---|---|---|---|---|---|
| 1 | A | A0001 | 1.0 | XXX | XXX | XXX |
| 2 | B | B0002 | 1.1 | XXX | XXX | XXX |
| 3 | C | C0001 | 2.0 | XXX | XXX | XXX |

EVENT VALIDATION USING MULTIPLE SOURCES

BACKGROUND

The present disclosure relates to event validation, and more specifically, to validating events processed by multiple sources.

Autonomous vehicles rely on sensors to determine trajectory options. These options are dependent on the situational awareness determined by evaluating events detected by the sensors. Typically, evaluations of events are done internally, by the vehicle, as events are detected. This makes the reliability of the evaluations solely based on the accuracy of the vehicle making the evaluation. The logic used in making evaluations is also dependent on the manufacturer providing the vehicle. The result of which creates varying degrees of accuracy across different vehicles.

SUMMARY

Various embodiments are directed to a method of event validation on a vehicle. The method can include detecting an event determined by the vehicle. Further, the method can include requesting an external event determination, from at least one external source within a surrounding area, based on the event. The external source can include other vehicles, stationary objects, and remote servers. The method can also include receiving the external event determination from the external source and also generating an internal event determination based on the event. The external event determination and the internal event determination are evaluated, and a validated event is determined. The method can also include requesting an external drive plan from the external source, within a second surrounding area, based on the validated event. The second surrounding area can be determined based on the validated event, wherein the size of the area is dependent on the event. The method can also include receiving the external drive plan while also generating an internal drive plan based on the validated event. The external drive plan and the internal drive plan can be evaluated, and a validated drive plan can be determined. The method can then implement the validated drive plan.

Further embodiments are directed to a computer program product for event validation on a system, which can include a computer readable medium having program instructions therewith, the program instructions executable by a processor to cause the system to execute instructions. The instructions can cause the system to request an external event determination, from at least one external source within a surrounding area, based on the event. The external source can include other vehicles, stationary objects, and remote servers. The instructions can also receive the external event determination from the external source and generate an internal event determination based on the event. The external event determination and the internal event determination are evaluated, and a validated event is determined. The instructions can also cause the system to request an external drive plan from the external source within a second surrounding area that is based on the validated event. The second surrounding area can be determined based on the validated event, wherein the size of the area is dependent on the event. Further, the instructions can also cause the system to receive the external drive plan and generate an internal drive plan based on the validated event. The external drive plan and the internal drive plan can be evaluated, and a validated drive plan can be determined. The instructions can then implement the validated drive plan.

Additional embodiments are directed to a system, which can include at least one processing component, at least one memory component, the memory component having program instructions which cause the processor to request an external event determination, from at least one external source within a surrounding area, based on the event. The external source can include other vehicles, stationary objects, and remote servers. The instructions can also cause to receive the external event determination from the external source and generate an internal event determination based on the event. The external event determination and the internal event determination are evaluated, and a validated event is determined. The instructions can also cause the system to request an external drive plan from the external source within a second surrounding area that is based on the validated event. The second surrounding area can be determined based on the validated event, wherein the size of the area is dependent on the event. Further, the instructions can also cause the system to receive the external drive plan and generate an internal drive plan based on the validated event. The external drive plan and the internal drive plan can be evaluated, and a validated drive plan can be determined. The instructions can then implement the validated drive plan.

BRIEF DESCRIPTION OF THE DRAWINGS

These and other features, aspects, and advantages of the embodiments of the disclosure will become better understood with regard to the following description, appended claims, and accompanying drawings where:

FIG. 4 is a block diagram of reliability and function tables, according to embodiments of the present disclosure.

Figure 1:
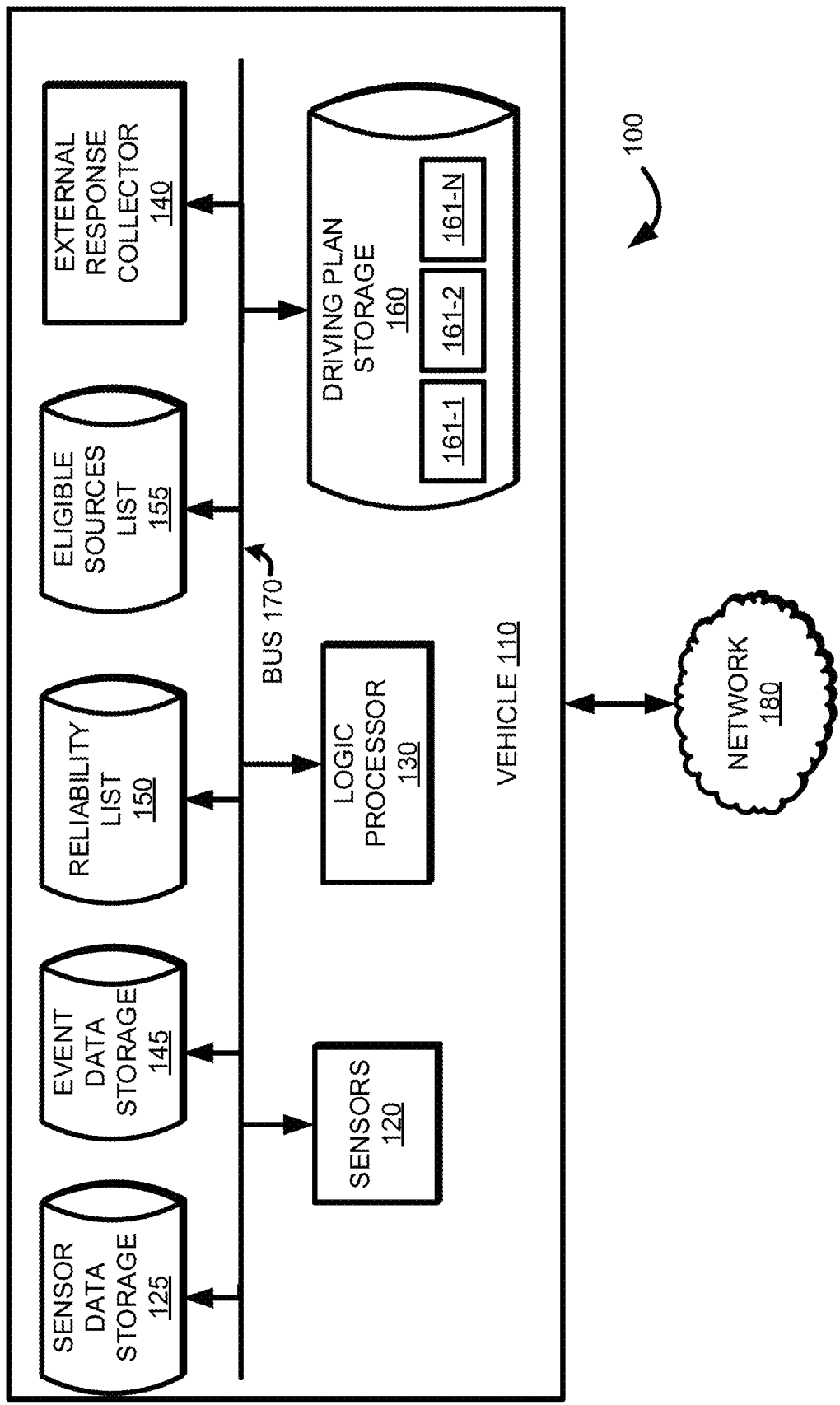
FIG. 1 is a block diagram illustrating an event validation system, according to embodiments of the present disclosure.

While the disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the dis-

DETAILED DESCRIPTION

How an autonomous vehicle moves is typically dictated by events detected by on-board sensors, models of the surrounding environment, and processors used to evaluate an event. These events are evaluated using algorithms and logic that typically offer improved consistency over human-operated vehicles. Most driving situations involve simple actions such as driving at the speed limit, following a vehicle from a safe distance, or stopping at a red light. However, there are instances when an autonomous vehicle must evaluate events in highly dynamic environments. For example, urban areas with different traffic participants such as other vehicles, cyclists, pedestrians, foreign objects, and animals. These highly dynamic environments require highly accurate evaluations, or an accident may result.

Once an evaluation occurs, a driving plan is generated and implemented in response to an event. In essence, the driving plan that the vehicle implements amounts to determining an appropriate sequence of adjustable configurations on the vehicle and specifying values of controllable variables (e.g., throttle, brake pressure, steering position). An erroneous evaluation can lead to the vehicle generating an erroneous driving plan that alters its trajectory resulting in an accident. Driving in environments, such as urban areas as mentioned above, can involve numerous event detections where a bad evaluation may lead to severe injury.

Also, significant time constraints may be present when having to evaluate a detected event. A vehicle may be limited in the time that can be spent on calculating a solution. For example, a vehicle traveling at a high rate of speed may have to apply the brakes promptly or risk hitting an object that has just been detected by a sensor. Thus, in order for a vehicle to encompass the complexity of the real world while utilizing sensors with limited precision, an event validation model can be employed. The basis for such a model is that information about the world and evaluations of surrounding scenes are not perfect and therefore susceptible to error. To mitigate these errors, a vehicle employing an event validation model may rely, not only on its own logic, but also on surrounding sources capable of evaluating situations detected by the vehicle.

Disclosed herein are a method and a system for event validation for autonomous vehicles. The method can be initiated by detecting an event determined by the vehicle. Once an event is detected, the vehicle can use its internal logic to make a determination on the event. Also, the vehicle can request an external evaluation for the event using the vehicle's sensor data. Once the determinations are made, the vehicle can validate an event based on, not only its internal logic, but also the logic employed by the surrounding external sources. Using that validated event, the vehicle can then generate a drive plan internally and may also request the external source generate a drive plan based on the validated event. Once the drive plans are determined, the vehicle can validate the plan to make a determination on a validated drive plan. Once validated, the drive plan can be implemented onto the vehicle.

FIG. 1 is a block diagram illustrating an event validation system 100, according to embodiments of the present disclosure. The event validation system 100 includes a vehicle 110 and a network 180. The vehicle 110 includes a sensor 120, sensor data storage 125, a logic processor 130, an external response collector 140, an event data storage 145, a reliability list 150, an eligible sources list 155, a driving plan storage 160, and a bus 170. The driving plan storage 160 includes driving plan 161-1, driving plan 161-2, and driving plan 161-N (collectively "driving plans 161").

The vehicle 110 is a component of the event validation system 100 configured to function according to a drive plan as determined by the various components within the system 100. Vehicle 110 can include any type of vehicle capable of implementing autonomous functionality. For example, passenger vehicles, transport vehicles, commercial vehicles, and off-road vehicles. Also, in some embodiments, the vehicle 110 can operate on varying levels of autonomy. These levels can include, for example, driver assistance, partial automation, conditional automation, high automation, and full automation. However, other levels of automation may exist in which the vehicle 110 may operate.

The sensor 120 is a component of the vehicle 110 configured to detect events. The sensor 120 can include various types of sensors capable of detecting events. For example, light detection and ranging sensors (LIDAR), cameras, radars, inertial measurement unit (IMU) sensors, global positioning system (GPS) sensors, and various other sensors capable of being used within an autonomous vehicle. The sensor 120 is also configured to store sensor data in a sensor data storage 125 upon detection of events requiring a response by the system 100. During operation, a sensor 120 may detect an object or anomaly deemed necessary of a response. That data can be stored for subsequent analysis by other components within the system 100.

The sensor data storage 125 is a component of the vehicle 110 configured to store sensor data collected by the sensor 120. The sensor data storage 125 can be any type of persistent storage capable of retaining event data over a period of time. For example, the sensor data storage 125 can be a hard drive, solid state drive, solid-state card, or any other type of non-volatile memory.

The logic processor 130 is a component of the vehicle 110 configured to process data obtained and collected by the vehicle 110. The logic processor is configured to evaluate sensor data collected by the sensor 120 and determine whether the sensor data amounts to an event that requires further analysis by the system 100. The logic processor 130 is also configured to determine a drive plan that includes trajectory planning and vehicular responses due to events within surrounding areas that may affect the vehicle 110. For example, a drive plan may dictate that the vehicle 110 swerve to the left and to also brake to a lower speed. The drive plan can also be trajectory planning for a trip from one location to another location taking known events into consideration. For instance, a drive plan may take into account a speed limit, known stop signs, distance, and other common events along a route. The drive plan can be altered as the trip is taking place when an unforeseen event is detected or when the route is altered. The logic processor 130 can take into account route planning, predictive models, local planning, contingency planning, including detected events when determining a decision and devising a drive plan.

The external response collector 140 is a component of the vehicle 110 configured to send requests and receive responses from external sources. In some embodiments, the external response collector 140 is configured to transmit sensor data to external sources that are compatible with the vehicle 110. The sensor data that is transmitted can be evaluated by the external sources that receive the data, process and render an event determination, and those determinations from the external sources can be transmitted back to the external response collector 140. In some embodiments, the external response collector 140 communicates with external sources via vehicle-to-vehicle (V2V) communication technology. Communication can also occur over various types of networks such as wireless wide area networks (WAN), cellular networks, global area networks, and wireless local area networks (WLAN).

In some embodiments, the external response collector 140 is configured to communicate with a server over a network 180 to receive and transmit data relating to the vehicle 110. For example, sensor data, event data, and drive plans can be sent to a server for storage and also for evaluations. Also, the external response collector 140 can receive information regarding the state of external sources within an area of the vehicle 110. This provides the vehicle 110 with possible external sources that may assist the vehicle 110 in making evaluations on events and drive plans.

The event data storage 145 is a component of the event validation system 100 configured to store event data and event determinations. The event data storage 145 can be any type of persistent storage capable of retaining event data over a period of time. For example, the event data storage 145 can be a hard drive, solid state drive, solid-state card, or any other type of non-volatile memory. Event data can be determined by the logic processor 130 when it evaluates sensor data detected by the sensors 120. Once generated, the event data storage 145 can retain the event data until such a time as to when the event data is no longer needed. The event data storage 145 is also configured to store event data collected by the external response collector 140. This data can be kept separate from the internal event data and segmented by the source that transmitted the event data. For example, the event data from a stationary sensor may be kept separate and apart from the internal event data.

The reliability list 150 is a file of the vehicle 110 configured to retain information pertaining to external sources. The reliability list 150 can include information such as available functions, logic type, software version, input conditions required, and an overall reliability percentage of the external source. Utilizing the reliability list, the vehicle 110 is able to determine what type of information can be transmitted to an external source, what type of information can be returned, as well as an overall reliability percentage of the result the external source determines. For example, the external response collector 140 can request an analysis on an event and receive a response back from an external source. That response can be weighed according to the reliability of that source. Factors that can affect the reliability of an external source can include the logic that is used, the version of software being implemented on the external source, past determinations made by the external source, and any other information that an administrator may find relevant.

The eligible sources list 155 is a file of the vehicle 110 configured to retain a list of available external sources capable of communicating with the vehicle 110. Eligible external sources may need to be inspected prior to data evaluations taking place. External sources may provide a limited amount of publicly available functions capable of analyzing requested data. For example, some sources may only offer evaluations on sensor data but not provide drive plan analyses. Other hinderances may include proper formatting of data, communication limitations, and poor reliability. As such, the eligible sources list 155 is maintained by the vehicle 110 to expedite data requests that are sent by the external response collector 140. In some embodiments, the eligible sources list 155 is consistently updated by a server in communication with the vehicle 110 over a network 180.

The driving plan storage 160 is a component of the vehicle 110 configured to retain drive plans 161. The driving plan storage 160 can be any type of persistent storage capable of retaining event data over a period of time. For example, the driving plan storage 160 can be a hard drive, solid state drive, solid-state card, or any other type of non-volatile memory. Driving plans can be determined by the logic processor 130 when it evaluates event data. Once generated, the driving plan storage 160 can retain the drive plans until such a time as to when the drive plan is no longer needed. The drive plan storage 160 is also configured to store drive plans collected by the external response collector 140. This data can be kept separate from the internally generated drive plans and segmented by the source that generated the drive plan. For example, the drive plan from another vehicle may be kept separate and apart from the internal drive plan.

The bus 170 is a component of the event validation system 100 configured to facilitate direct, high-speed transfer and communication between the components within the system 100. Embodiments of the bus 170 include parallel buses, serial buses, and any combination thereof.

The network 180 is a component of the event validation system 100 configured to facilitate data transfers and communications between the system 100, servers, and external sources. Examples of the network 180 include a local area network (LAN), a wide area network (WAN), a storage area network (SAN), intranet, or any combination thereof.

Figure 2:
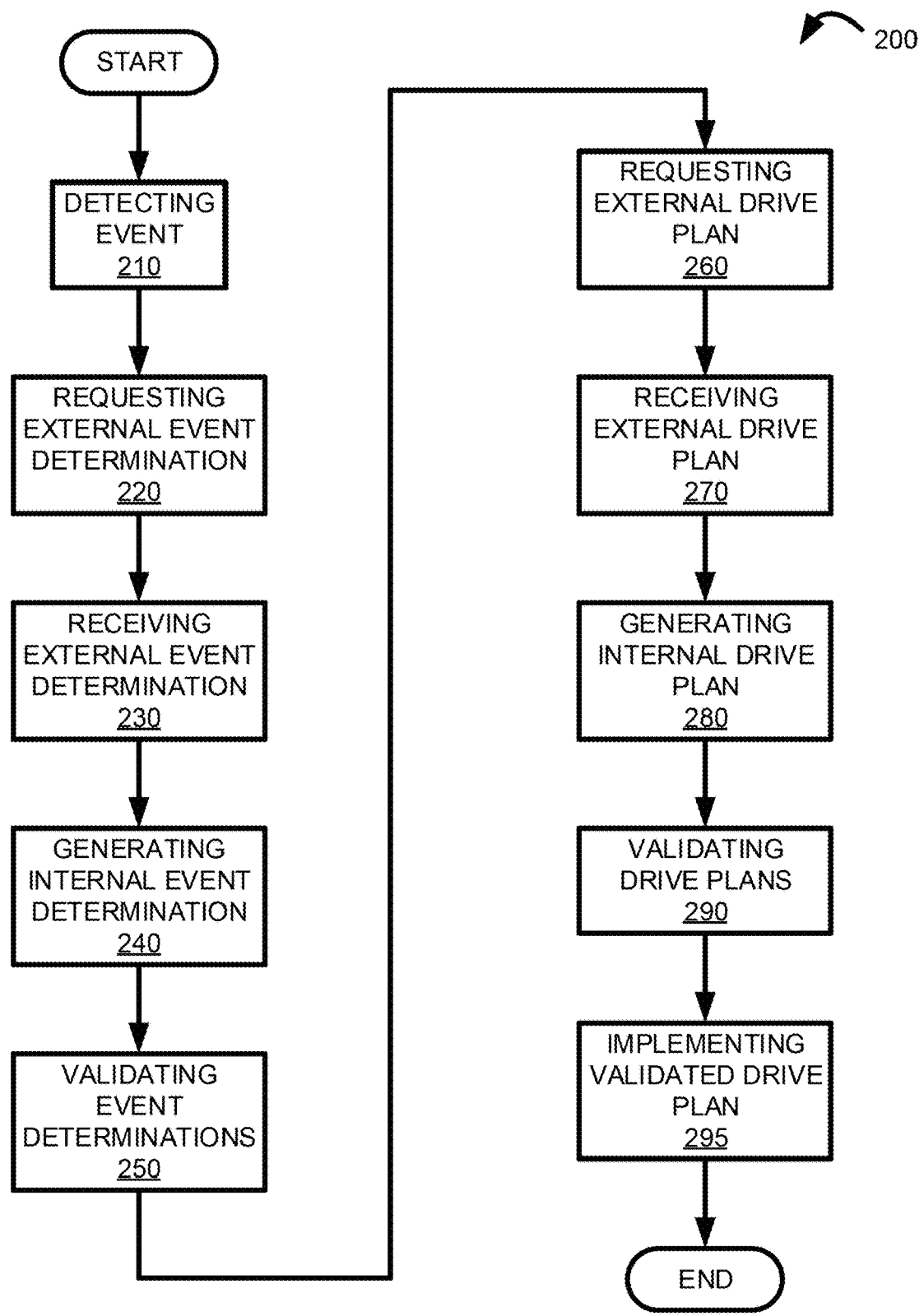
FIG. 2 is a flow diagram illustrating a process of event validation on an event validation system, according to embodiments of the present disclosure.

FIG. 2 is a flow diagram illustrating a process 200 for event validation, according to embodiments of the present disclosure. To illustrate process 200, FIG. 2 is described within the context of the event validation system 100 of FIG. 1.

The vehicle 110 detects an event requiring evaluation. This is illustrated at step 210. The detected event can originate from the sensors 120 or from external sources that transmit events to the vehicle 110 for evaluation. For example, a sensor may detect an object on the roadway that the vehicle 110 may need to avoid. Another event may be an upcoming speed limit that the vehicle 110 is about to approach. An event can be any information in which the vehicle 110 may need to evaluate while operating autonomously. In some embodiments, prior to any movement, the vehicle 110 receives several possible events over a given area between the vehicle 110 and a destination. Each event received can be evaluated individually as well all together, by the logic processor 130.

In some embodiments, the vehicle 110 requests events over a given area. During route planning, a vehicle may inquire about disclosed events along the route. For example, external sources may detect an accident along the route and transmit that event data to a server that the vehicle 110 can access. Utilizing that retrieved event data, the vehicle 110 can generate an initial drive plan.

The external response collector 140 requests external evaluation of the detected event. This is illustrated at step 220. A request is sent out by the external response collector 140 to available external sources that can process the event. Utilizing the eligible sources list, the external response collector can transmit relevant data (e.g., sensor data, event data) to external sources on the list for evaluation. An evaluation can be conducted using the logic, reasoning, and processing used by the external source on the data gathered by the vehicle 110. For example, if an object is detected by the vehicle 110 using a sensor 120, that information is directly transmitted to an external source where the evaluation conducted by the external source is as if the external source was the vehicle 110.

In some embodiments, external sources may analyze event data gathered by their own sensors. This data can be transferred back to the vehicle in conjunction with the requested data. The additional data can be used in deciding on the event independent from the requested data.

The external response collector 140 receives an external event determination from an external source. This is illustrated at step 230. Once an external source evaluates the data sent by the vehicle 110 it is then returned to the vehicle 110. Each external source that the vehicle 110 requested to receive the sensor data is eligible to evaluate the data using their own logic. Once completed the external sources can transmit the results back. In some embodiments, the vehicle 110 waits a predetermined amount of time to receive a response. Depending on the event, only a brief allotment of time is available before the vehicle 110 must act on the event. By basing the time allotment on the event, the vehicle 110 can request evaluations in a safe manner. If an external vehicle fails to respond within the allotment of time, the vehicle 110 can ignore the external source and act based on its own logic.

The vehicle 110 generates an internal event determination based on the sensor data received. This is illustrated at step 240. The sensor data is processed by the logic processor 130 using the internal components and models installed in the vehicle 110. Once evaluated, the logic processor 130 can generate an internal event determination that can be weighed against the external event determination. In some embodiments, the vehicle 110 is included in the reliability list including a reliability percentage of the calculations produced by the vehicle 110. This allows for an objective analysis of the processing capabilities of the vehicle 110. For example, if historical data indicates that the vehicle's 110 logic struggles to identify obstructions in the road, the reliability percentage of such an analysis will be indicative of that historical data.

An overall event is validated based on the weighted event determinations of the vehicle 110 and the external sources. This is illustrated at step 250. As the event determinations are received by the external response collector 140, they are weighed by their reliability percentage stored within the reliability list 150. Once all event determinations are weighed, including the internal event determination, an overall event is validated so that it can be used as a basis for further analysis. For example, if an animal is detected by the sensors 120, the logic processor 130 and the external sources can evaluate the data and make individual determinations as to what kind of animal was detected. If the highest reliability calculation determines that the animal is a cat, then that determination can be used in determining a drive plan if necessary.

A request is sent to external sources within a second surrounding area to generate an external drive plan based on the validated event. This is illustrated at step 260. Similar to the event determination, the vehicle 110 can request compatible external sources for an independent drive plan calculation based on the vehicle's 110 own data. An external source, listed in the eligible sources list 155 and within a second area, can be sent the validated event and use their internal logic to produce an outcome. In some embodiments, the vehicle 110 transmits the validated event to a server, over the network 180, and requests the server analyze the validated event. Also, the event can also be used by subsequent vehicles in generating their own drive plans.

In some embodiments, the second surrounding area is based on the validated event. The size of the area can be adjusted based on the amount of time allotted to the vehicle 110 before an action is required. In some other embodiments, the second surrounding area is based on the number of external sources. For example, the area can be adjusted to encompass more or less sources depending on the configuration of the vehicle 110.

The external drive plans determined by the external sources are received by the external response collector 140. This is illustrated at step 270. Once an external source evaluates the validated event sent by the vehicle 110, an external drive plan is returned to the vehicle 110. Each external source that the vehicle 110 requested to receive the validated event is eligible to evaluate the data using their own logic. Once completed the external sources can transmit the results back. In some embodiments, the vehicle 110 waits a predetermined amount of time to receive a response. Depending on the event, only a brief allotment of time is available before the vehicle 110 must act on the event. By basing the time allotment on the event, the vehicle 110 can request evaluations in a safe manner. If an external vehicle fails to respond within the allotment of time, the vehicle 110 can ignore the external source and act based on its own logic using the validated event.

The vehicle 110 generates an internal drive plan based on the validated event. This is illustrated at step 280. The validated event is processed by the logic processor 130 using the internal components and models installed in the vehicle 110. Once evaluated, the logic processor 130 can generate an internal drive plan that can be weighed against the external drive plans. In some embodiments, the vehicle 110 is included in the reliability list including a reliability percentage of the calculations produced by the vehicle 110. This allows for an objective analysis of the processing capabilities of the vehicle 110. The internal drive plan determination may be generated prior to requesting an external drive plan, concurrently with the request, or subsequent to the request.

An overall drive plan is validated based on the weighted event determinations of the vehicle 110 and the external sources. This is illustrated at step 290. As the event determinations are received by the external response collector 140, they are weighed by their reliability percentage stored within the reliability list 150. Once all drive plan determinations are weighed, including the internal drive plan determination, an overall drive plan can be validated so that it can be implemented by the vehicle 110. This is illustrated at step 295.

Figure 3:
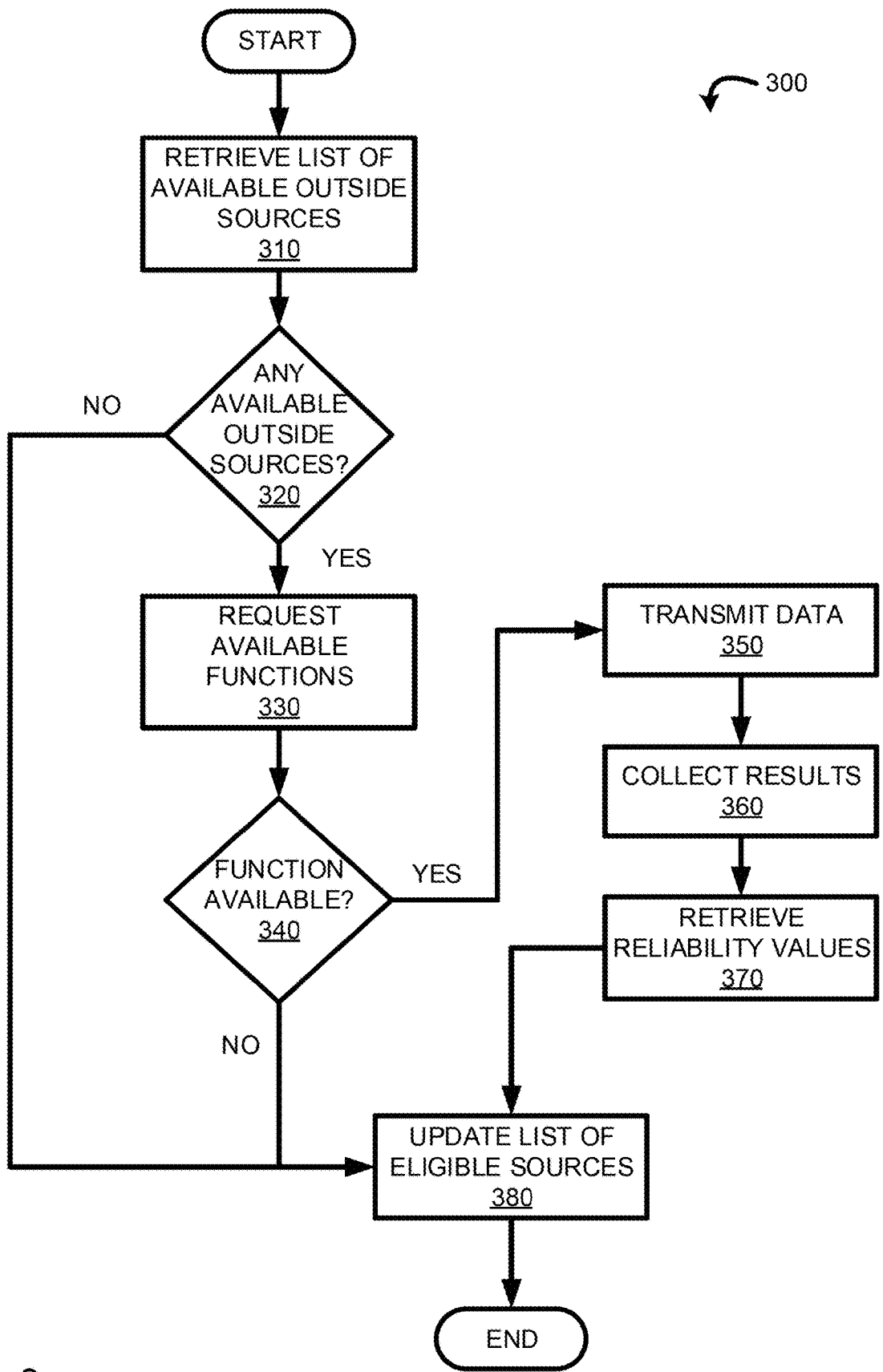
FIG. 3 is a flow diagram illustrating a process of obtaining a list of compatible external sources, according to embodiments of the present disclosure.

FIG. 3 is a flow diagram illustrating a process 300 of obtaining a list of compatible external sources, according to embodiments of the present disclosure. To illustrate process 300, FIG. 3 is described within the context of the event validation system 100 of FIG. 1.

The vehicle 110 retrieves a list of available external sources. This is illustrated at step 310. The list may be retrieved by scanning a surrounding area for possible sources. The vehicle 110 can ping sources within an area and every source that responds can be placed onto the list of available sources. Also, the list may be retrieved from a server that maintains a list of possible sources for a given area. For example, a list of stationary sensors along a planned route may be sent to the vehicle 110, from a server, over the network 180.

A determination is made as to whether any external sources are available and on the list. This is illustrated at step 320. Depending on the situation, no external sources may be available within a given area. If that occurs, the process can proceed by updating the eligible sources list 155. However, if external sources are available, the process can proceed to step 330.

The vehicle 110 requests all publicly available functions provided by the available external sources. This is illustrated at step 330. Each source may offer different processing functionalities. For example, one external source may only offer functions relating to route planning, while other external sources may offer event detection, route planning, and various other functions that they can perform. Depending on the functions available, the vehicle 110 may or may not be able to utilize that external source for calculation. The functions may not be compatible, they may require additional information that the vehicle 110 cannot provide, or it may be that the function types the vehicle provides are not needed.

A determination is made as to whether or not the functions the vehicle 110 is requesting are available. This is illustrated at step 340. The vehicle 110 may request functions pertaining to the various needs of the vehicle 110 regarding a particular route or trajectory. For example, the vehicle 110 may request event determination functions regarding a moving object or it can request a drive plan determination based on an event. If the requested function is not available, the process 300 can proceed by updating the eligible sources list 155. However, if the function is available, the process 300 can proceed to step 350.

The vehicle 110 can transmit data to the external source with the applicable functions for analysis. This is illustrated at step 350. Once the vehicle 110 determines that the external source can provide the functions requested, the vehicle 110 can then transmit the data to be evaluated. In some embodiments, the data is sensor data that is evaluated to determine an event. In some other embodiments, the data that is sent is a validated event to determine a drive plan. Once transmitted, the vehicle 110 can wait a predetermined amount of time, or until the vehicle can no longer wait for a response, for the external source to produce a result.

The vehicle 110 collects the results of the functions provided by the external sources. This is illustrated at step 360. Function results can be weighed based on their reliability percentage as they are received by the vehicle 110. This is illustrated at step 370. By weighing the results, the event validation system 100 can utilize the most reliable data when making a determination for the vehicle 110.

The eligible sources list 155 is updated based on the determinations made in process 300. This is illustrated at step 380. If no available sources are available, the eligible sources list 155 can reflect that determination. If external sources are available, but their functionality is incompatible with the vehicle's 110 request, the eligible sources list 155 can also reflect that. Also, if it is determined that an external source is available and provides functions compatible with the vehicle 110, the eligible sources list 155 can also reflect that. By updating the eligible sources list 155 in such a manner, the event validation system 100 can efficiently produce an overall result instead of querying external sources for their functionality each time an event occurs.

FIG. 4 is a block diagram of reliability and function tables 400 for the event validation system 100, according to embodiments of the present disclosure. The reliability and function tables 400 include an eligible sources list table 410 (e.g., which may be the same as, or substantially similar to, the eligible sources list 155 of FIG. 1), a reliability list table 420 (e.g., which may be the same as, or substantially similar to, the reliability list 150 of FIG. 1), and a function list table 430. The arrangement of columns and records making up the exemplary tables illustrated in FIG. 4 are for explanation, not for limitation. Other formats and variations useful to various embodiments of the present disclosure may be included but not shown in FIG. 4, as occurs to those of skill in the art.

The eligible sources list table 410 is a table of external sources with various fields of information about each source that are compatible with the vehicle 110. The external source list 410 can include columns indicating destination 411, function type 412, logic identification 413, software version 414, mandatory input requirements 415, input conditions 416, input required 417, output structure 418, and reliability percentage 419. However, other columns can be present in table 410. This table can be compiled by the event validation system 100 by retrieving a reliability list table 420 along with retrieving a function list table 430 from various external sources.

The reliability list table 420 can include fields such as function type 422, logic identification 424, version 426, input conditions 427, and reliability percentages 429. However, other fields can be present in table 420. In some embodiments, the reliability list table 420 can be held internally by the vehicle 110 and updated periodically by a server maintaining an overall reliability list for various sources and functions.

The function list table 430 is a representation of a response back to a vehicle 110 when determining the functionality of the external sources. The function list table 430 can include fields such as function type 431, logic identification 432, software version 433, mandatory input format 434, input conditions 435, and output format 436. This allows the event validation system 100 to analyze the external source for compatible public functions.

Figure 5:
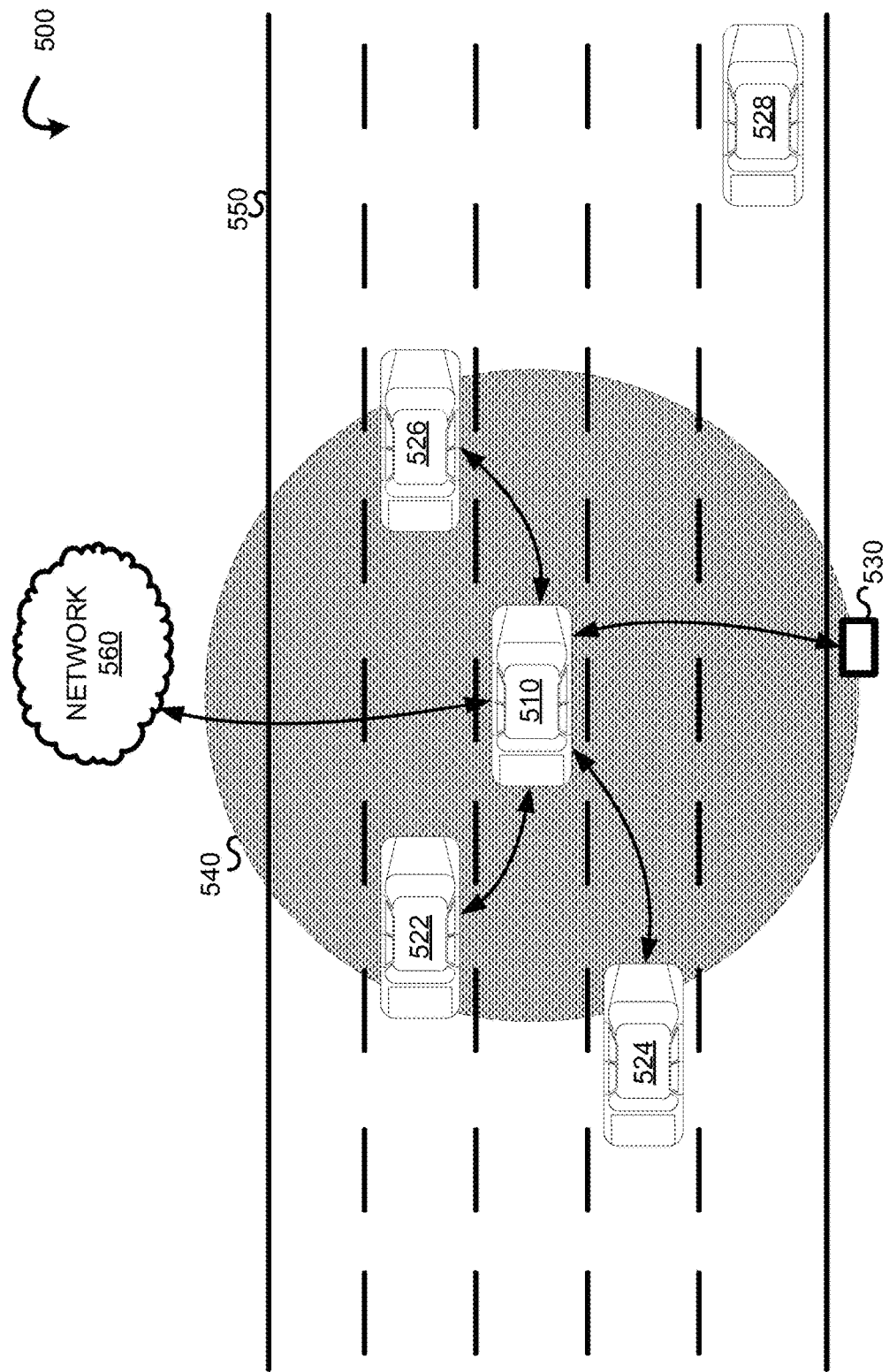
FIG. 5 is a block diagram of a vehicle communicating with external sources within a surrounding area, according to embodiments of the present disclosure.

FIG. 5 is a diagrammatic illustration of an environment 500 with an events validation system 100 operating on a roadway, according to embodiments of the present disclosure. The environment 500 includes, but is not limited to, a vehicle 510, external vehicles 522, 524, 526, 528, a stationary sensor 530, a surrounding area 540 (illustrated by a shaded dashed circled around vehicle 510), a roadway 550, and a network 560.

The vehicle 510 (e.g., which may be the same as, or substantially similar to vehicle 110 of FIG. 1), illustrates an embodiment of the event validation system 100 in operation. The surrounding area 540 provides an area in which the vehicle 510 can communicate with external sources. Depending on the calculation request, the surrounding area 540 may expand or contract based on the amount of time allotted for the calculation and the number of external vehicles encompassed within the area.

In this example, the vehicle 510 can communicate with vehicle 522, 524, 526, stationary sensor 530, as well as communication with sources over the network 560. This is illustrated using bidirectional arrows to and from the vehicle 510. While these external sources may be within the surrounding area 540, it is not necessary for the vehicle 510 to communicate and request calculations from each source. A priority can be made by the vehicle 510 that permits the vehicle 510 to communicate with external sources that meet a predetermined threshold. For example, the vehicle 510 may set a reliability requirement to 75%. Any external source, regardless of being within the surrounding area 540, not meeting the threshold may not receive a request for calculation/evaluation. Other thresholds can also be used such as response time, logic used, manufacturer, and logic software version. These thresholds can also relate to stationary sensors such as the stationary sensor 530. These sources can be placed along the roadway as a type of infrastructure placed to provide autonomous vehicles with information regarding the area in which the sensor is stationed.

Also, as shown, the vehicle 510 is unable to communicate with the vehicle 528 due to, at least in part, because the vehicle 528 is external the surrounding area 540 determined by the event validation system 100. Vehicles traveling along the roadway 550 may also not necessarily be able to communicate with the vehicle 510 for various reasons. Reasons such as not having autonomous capabilities, incompatible logic algorithms, lack of publicly available functions, or it could be that the source was placed on an excluded list preventing the vehicle 110 from any communication with that source.

Figure 6:
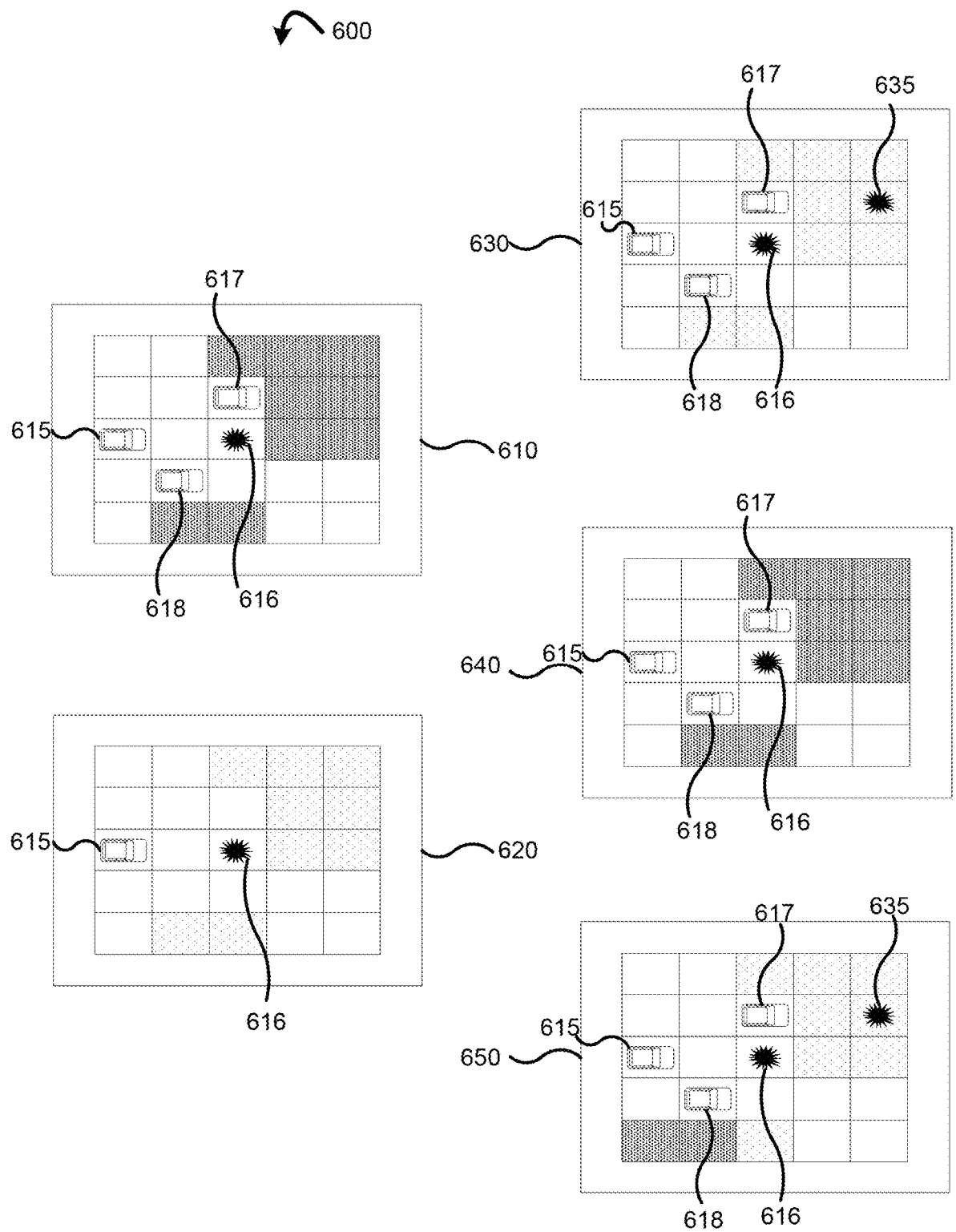
FIG. 6 is a block diagram illustrating an area where events are detected, according to embodiments of the present disclosure.

FIG. 6 is a diagrammatic illustration of an event collection 600 for the event validation system 100, according to embodiments of the present disclosure. The collection 600 includes initial sensor scanned area 610, a requested area 620, an external source area scanned area 630, an event determination area 640, and a validated area 650.

The initial sensor scanned area 610 includes vehicle 615 operating the event validation system 100, vehicle 617, 618, and object 616. The scanned area 610 displays the sensor scan of vehicle 615 that has detected two external sources in vehicles 617 and 618 as well as an object 616 along the route. This initial scan displays the ability of vehicle 615 to initiate communication with vehicles 617 and 618 in evaluating the object 616 as well the surrounding area. The shaded blocks of the scanned area 610 illustrate the blind spots of vehicle 615 in which its sensors are unable to scan due to objects and vehicles blocking the scan. Once the scan is conducted, the vehicle can verify that vehicles 617 and 618 can evaluate object 616 and scan any portion of the area in which vehicle 615 is unable to scan.

Requested area 620 illustrates the information that can be transmitted to vehicles 617 and 618. The information contains the area in which the vehicle 615 is inquiring about as well as the object 616. Depending on the type of request, the vehicles 617 and 618 can evaluate the object 616 and transmit an event determination. Vehicles 617 and 618 can also evaluate the area requested using their own sensors and return any detected objects, or vehicles 617 and 618 can return both the event determination on object 616 and any additional objects detected.

The external source scanned area 630 is an example of the type of information that can be returned to vehicle 615 after a request for an area to be scanned by vehicles 617 and 618. The blind spots that could not be scanned by vehicle's 615 sensors can be scanned by external sources within the area. Another object 635 was detected by vehicle 617 and a secondary event reported back to vehicle 615. The secondary event that was detected by vehicle 617 was initially undetected by vehicle 615. This information can be used by vehicle 615 to evaluate the object 635 using its own processing capabilities or vehicle 615 can rely on the analysis conducted by vehicle 617. Vehicle 618 did not detect any additional objects within the requested area and returned no objects.

The event determination area 640 is an example of vehicles 617 and 618 evaluating object 616 for vehicle 615. Once both vehicles 617 and 618 conduct their analysis, they can return an event determination back to vehicle 615 so that those determinations can be weighed, and overall validated event can be produced. If the validated event is determined to be an object that requires further action by the vehicle 615, a drive plan determination may be conducted. However, if the object 616 was determined to be an object not requiring further action, the vehicle 615 can disregard the information and proceed along its current trajectory and route.

The validated area 650 represents an area representing both the blind spot area detection and the event determination combined. Vehicles 617 and 618 can provide the vehicle 615 with an event determination on object 616 allowing vehicle 615 to validate the object 616. The vehicle 615 can also utilize the object 635, detected by vehicle 617, when altering its drive plan and trajectory. For example, to avoid object 616, the vehicle 615 can move to the left or the right. However, if the vehicle 615 utilizes the information gathered by vehicle 617, the vehicle 615 can move to the right and avoid both objects 616 and 635 while implementing only one evasive maneuver.

In some embodiments, the processes of event validation on a vehicle described herein could be implemented in a cloud computing environment, which is described below with respect to FIGS. 7, 8, and 9. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
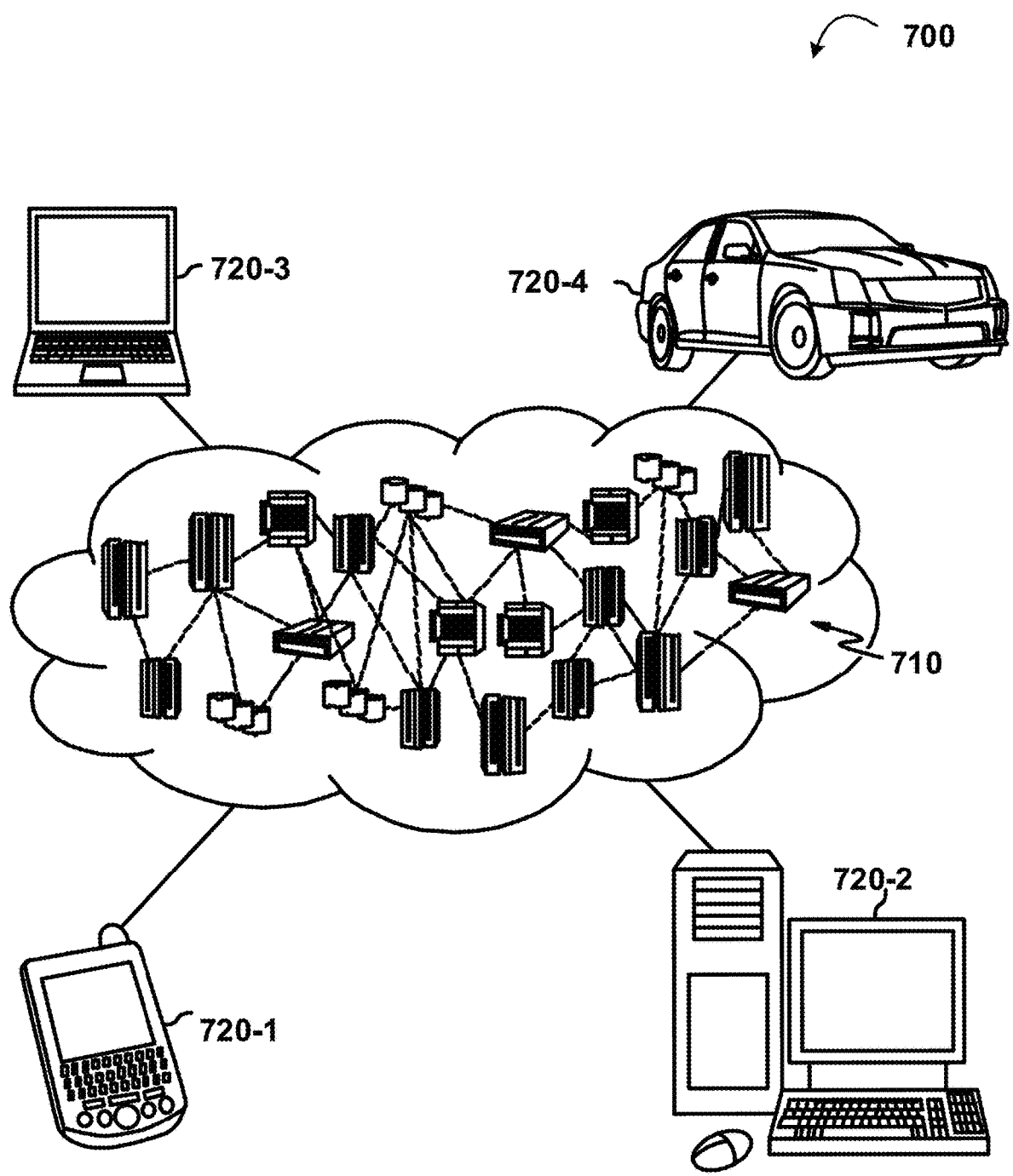
FIG. 7 is a block diagram illustrating a cloud computing environment, according to some embodiments of the present disclosure.

FIG. 7 is a block diagram illustrating a cloud computing environment 700, according to some embodiments of the present disclosure. As shown, cloud computing environment 700 includes one or more cloud computing nodes 710 with which local computing devices used by cloud consumers, such as, for example, personal digital assistant (PDA) or cellular telephone 720-1, desktop computer 720-2, laptop computer 720-3, and/or automobile computer system 720-4 may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 720-1-720-4 shown in FIG. 7 are intended to be illustrative only and that computing nodes 710 and cloud computing environment 700 can communicate with any type of computerized device over any type of network and/or network addressable connection (e.g., using a web browser).

Figure 8:
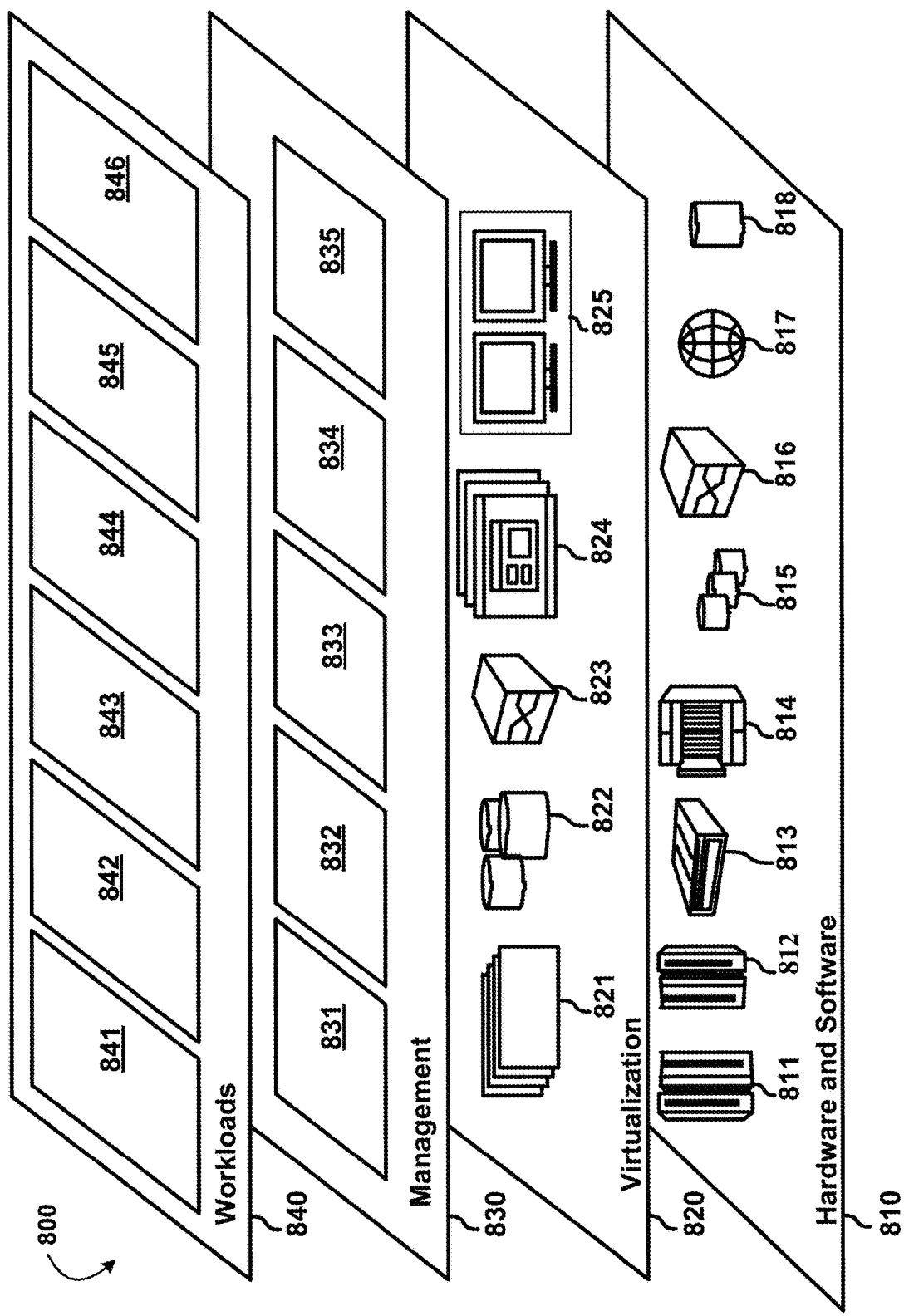
FIG. 8 is a block diagram illustrating a set of functional abstraction model layers provided by the cloud computing environment, according to some embodiments of the present disclosure.

FIG. 8 is a block diagram illustrating a set of functional abstraction model layers 800 provided by the cloud computing environment 700, according to some embodiments of the present disclosure. It should be understood in advance that the components, layers, and functions shown in FIG. 8 are intended to be illustrative only and embodiments of the invention are not limited thereto. As depicted, the following layers and corresponding functions are provided:

Hardware and software layer 810 includes hardware and software components. Examples of hardware components include: mainframes 811; RISC (Reduced Instruction Set Computer) architecture-based servers 812; servers 813; blade servers 814; storage devices 815; and networks and networking components 816. In some embodiments, software components include network application server software 817 and database software 818.

Virtualization layer 820 provides an abstraction layer from which the following examples of virtual entities may be provided: virtual servers 821; virtual storage 822; virtual networks 823, including virtual private networks; virtual applications and operating systems 824; and virtual clients 825.

In one example, management layer 830 provides the functions described below. Resource provisioning 831 provides dynamic procurement of computing resources and other resources that are utilized to perform tasks within the cloud computing environment. Metering and Pricing 832 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 833 provides access to the cloud computing environment for consumers and system administrators. Service level management 834 provides cloud computing resource allocation and management such that required service levels are met. Service Level Agreement (SLA) planning and fulfillment 835 provide pre-arrangement for, and procurement of, cloud computing resources for which a future requirement is anticipated in accordance with an SLA.

Workloads layer 840 provides examples of functionality for which the cloud computing environment can be utilized. Examples of workloads and functions that can be provided from this layer include: mapping and navigation 841; software development and lifecycle management 842; virtual classroom education delivery 843; data analytics processing 844; and transaction processing 845.

Figure 9:
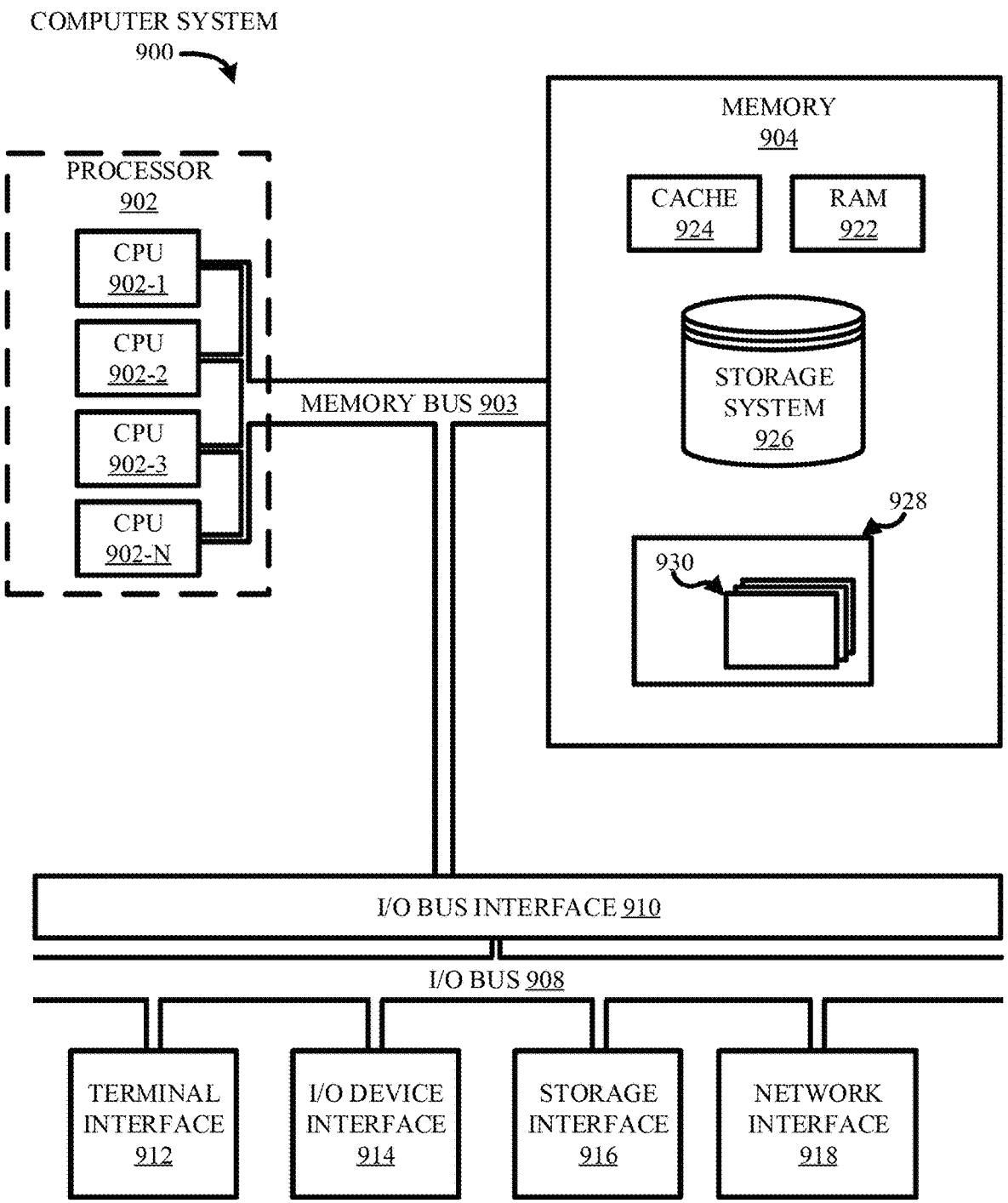
FIG. 9 is a high-level block diagram illustrating an example computer system that may be used in implementing one or more of the methods, tools, and modules, and any related functions, described herein, in accordance with embodiments of the present disclosure.

Referring now to FIG. 9, shown is a high-level block diagram of an example computer system 900 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 900 may comprise one or more CPUs 902, a system memory 904, a terminal interface 912, a storage interface 916, an I/O (Input/Output) device interface 914, and a network interface 918, all of which may be communicatively coupled, directly or indirectly, for inter-component communication via a memory bus 903, a I/O bus 908, and an I/O bus interface 910.

The computer system 900 may contain one or more general-purpose programmable central processing units (CPUs) 902A, 902B, 902C, and 902D, herein generically referred to as the CPU 902. In some embodiments, the computer system 900 may contain multiple processors typical of a relatively large system; however, in other embodiments the computer system 900 may alternatively be a single CPU system. Each CPU 902 may execute instructions stored in the system memory 904 and may include one or more levels of on-board cache.

System memory 904 may include computer system readable media in the form of volatile memory, such as random-access memory (RAM) 922 or cache memory 924. Computer system 900 may further include other removable/non-removable, volatile/non-volatile computer system storage media. By way of example only, storage system 926 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 904 can include flash memory, e.g., a flash memory stick drive or a flash drive. Memory devices can be connected to memory bus 903 by one or more data media interfaces. The memory 904 may include at least one program product having a set (e.g., at least one) of program modules that are configured to carry out the functions of various embodiments.

One or more programs/utilities 928, each having at least one set of program modules 930 may be stored in memory 904. The programs/utilities 928 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 928 and/or program modules 930 generally perform the functions or methodologies of various embodiments.

Although the memory bus 903 is shown in FIG. 9 as a single bus structure providing a direct communication path among the CPUs 902, the system memory 904, and the I/O bus interface 910, the memory bus 903 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 910 and the I/O bus 908 are shown as single respective units, the computer system 900 may, in some embodiments, contain multiple I/O bus interfaces 910, multiple I/O buses 908, or both. Further, while multiple I/O interface units are shown, which separate the I/O bus 908 from various communications paths running to the various I/O devices, in other embodiments some or all of the I/O devices may be connected directly to one or more system I/O buses.

In some embodiments, the computer system 900 may be a multi-user mainframe computer system, a single-user system, or a server computer or similar device that has little or no direct user interface but receives requests from other computer systems (clients). Further, in some embodiments, the computer system 900 may be implemented as a desktop computer, portable computer, laptop or notebook computer, tablet computer, pocket computer, telephone, smart phone, network switches or routers, or any other appropriate type of electronic device.

It is noted that FIG. 9 is intended to depict the representative major components of an exemplary computer system 900. In some embodiments, however, individual components may have greater or lesser complexity than as represented in FIG. 9, components other than or in addition to those shown in FIG. 9 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium is a tangible device that can retain and store instructions for use by an instruction execution device. Examples of computer readable storage media can include an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

What is claimed is:

1. A computer implemented method for event validation on a vehicle, the method comprising:
    detecting an event determined by the vehicle;
    maintaining, by the vehicle, a reliability list of reliable external sources, wherein the reliability list includes available functions, logic type, software versions, and input conditions for each of the reliable external sources;
    transmitting sensor data and event data relating to the event to at least one external source for evaluation in accordance with the input conditions of the external source in the reliability list;
    receiving an external event determination from the external source within a first surrounding area, based on the event data;
    generating an internal event determination based on the event;
    validating a validated event based on the external event determination and the internal event determination, wherein the validated event is based on a validation of internal logic performed on the event by the vehicle and the external source;
    receiving an external drive plan from the external source within a second surrounding area, based on the validated event;
    generating an internal drive plan based on the validated event;
    validating a validated drive plan based on the external drive plan and the internal drive plan; and
    implementing the validated drive plan on the vehicle.

2. The computer implemented method of claim 1, wherein validating the validated event comprises:

weighing the external event determination and the internal event determination based on a reliability percentage maintained by the reliability list; and determining a validated event in response to weighing the external event determination and the internal event determination.

3. The computer implemented method of claim 2, wherein validating the validated drive plan comprises:

weighing the external drive plan and the internal drive plan based on a reliability percentage maintained by the reliability list; and determining a validated drive plan in response to weighing the external drive plan and the internal drive plan.

4. The computer implemented method of claim 2, wherein the reliability list is updated by a reliability server over a network.

5. The computer implemented method of claim 1, further comprising:

receiving a secondary event within the first surrounding area undetected by the vehicle from the external source.

6. The computer implemented method of claim 1, wherein the second surrounding area is based on the validated event.

7. The computer implemented method of claim 1, wherein requesting the external event determination comprises:

requesting a list of available public functions provided by the external source;

collecting the list from the external source;

determining whether the list is compatible with the vehicle based on the event; and requesting the external event determination, from the external source within the first surrounding area, based on the event and upon determining that the list is compatible with the vehicle.

8. The computer implemented method of claim 1, wherein detecting the event determined by the vehicle further comprises:

determining a size of the first surrounding area based on an amount of time allotted for a calculation relating to the event; and receiving a plurality of secondary events from at least one secondary source within the first surrounding area.

9. The computer implemented method of claim 8, wherein generating the internal drive plan is based on the validated event and the secondary events.

10. A computer program product for event validation on a vehicle, the computer program product comprising a computer readable storage medium having program instructions embodied therewith, the program instructions executable by a computer system to cause the computer system to:

detect an event determined by the vehicle;

maintaining, by the vehicle, a reliability list of reliable external sources, wherein the reliability list includes available functions, logic type, software versions, and input conditions for each of the reliable external sources;

transmit sensor data and event data relating to the event to at least one external source for evaluation in accordance with the input conditions of the external source in the reliability list;

receive an external event determination from the external source within a first surrounding area, based on the event data;

generate an internal event determination based on the event;

validate a validated event based on the external event determination and the internal event determination, wherein the validated event is based on a validation of internal logic performed on the event by the vehicle and the external source;

receive an external drive plan from the external source within a second surrounding area, based on the validated event;

generate an internal drive plan based on the validated event;

validate a validated drive plan based on the external drive plan and the internal drive plan; and implement the validated drive plan on the vehicle.

11. An event validation system for a vehicle, comprising:

a sensor configured to detect an event;

a logic processor configured to process the event and make an event determination;

an external response collector configured to receive an external event determination from an external source based on sensor data and event data relating to the event and transmitted to the external source for evaluation, the external response collector further configured to receive an external drive plan from the external source at least partially based on the external event determination and the event determination wherein the external response collector is configured to receive responses from the external source within a surrounding area of the vehicle determined by the event;

a reliability list of reliable external sources including a list of available functions, logic type, software versions, and input conditions for each of the reliable external sources, wherein the external response collector is configured to weigh the external source based on the reliability list; and wherein the logic processor is further configured to generate a drive plan to implement on the vehicle, wherein the drive plan is at least partially based on the event, the external event determination, and the external drive plan.

12. The event validation system of claim 11, further comprising:

an event data storage configured to store events detected by the sensor.

13. The event validation system of claim 11, wherein the sensor includes a light detection and ranging sensor.

14. The event validation system of claim 11, wherein the external response collector is further configured to transmit and receive server event data and server drive plan data over a network.

15. The event validation system of claim 14, wherein the logic processor is further configured to generate the drive plan based at partially on the server event data and the server drive plan data.

16. The event validation system of claim 11, wherein the external source includes a stationary sensor.

17. The event validation system of claim 11, further comprising:

a drive plan storage configured to store the drive plan and the external drive plan.

* * * * *